July 31, 1956

F. A. ZAENKERT 2,756,666

MEAT IMPREGNATOR

Filed March 17, 1953

INVENTOR.
FREDERICK A. ZAENKERT
BY
J. Warren Kinney, Jr.
ATTORNEY

July 31, 1956     F. A. ZAENKERT     2,756,666
MEAT IMPREGNATOR
Filed March 17, 1953     4 Sheets-Sheet 2
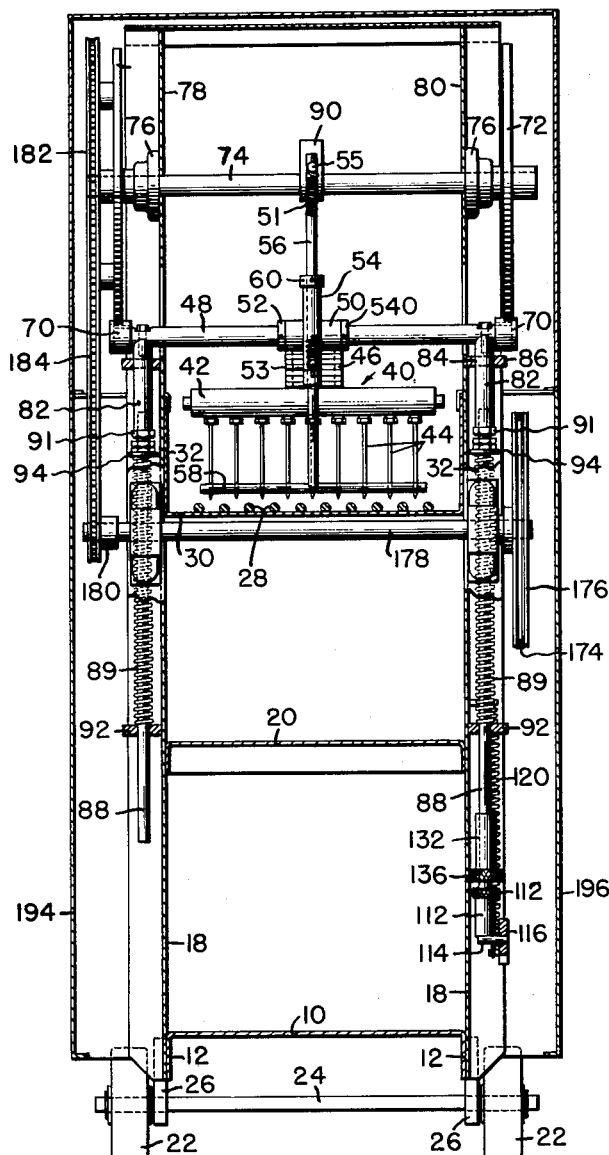
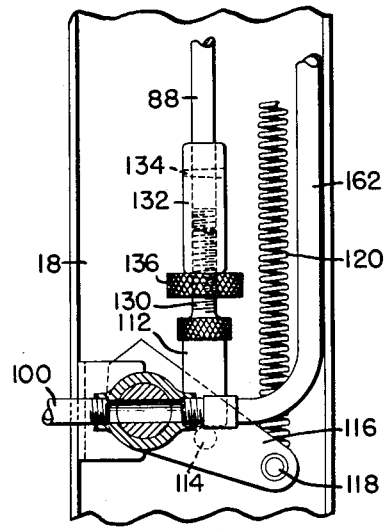
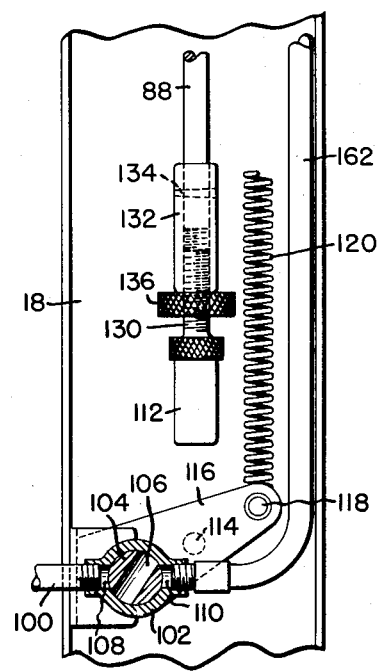
INVENTOR.
FREDERICK A. ZAENKERT
BY
J. Warren Kinney Jr.
ATTORNEY July 31, 1956 F. A. ZAENKERT 2,756,666
MEAT IMPREGNATOR Filed March 17, 1953 4 Sheets-Sheet 3

INVENTOR.
FREDERICK A. ZAENKERT
BY
J. Warren Kinney, Jr.
ATTORNEY

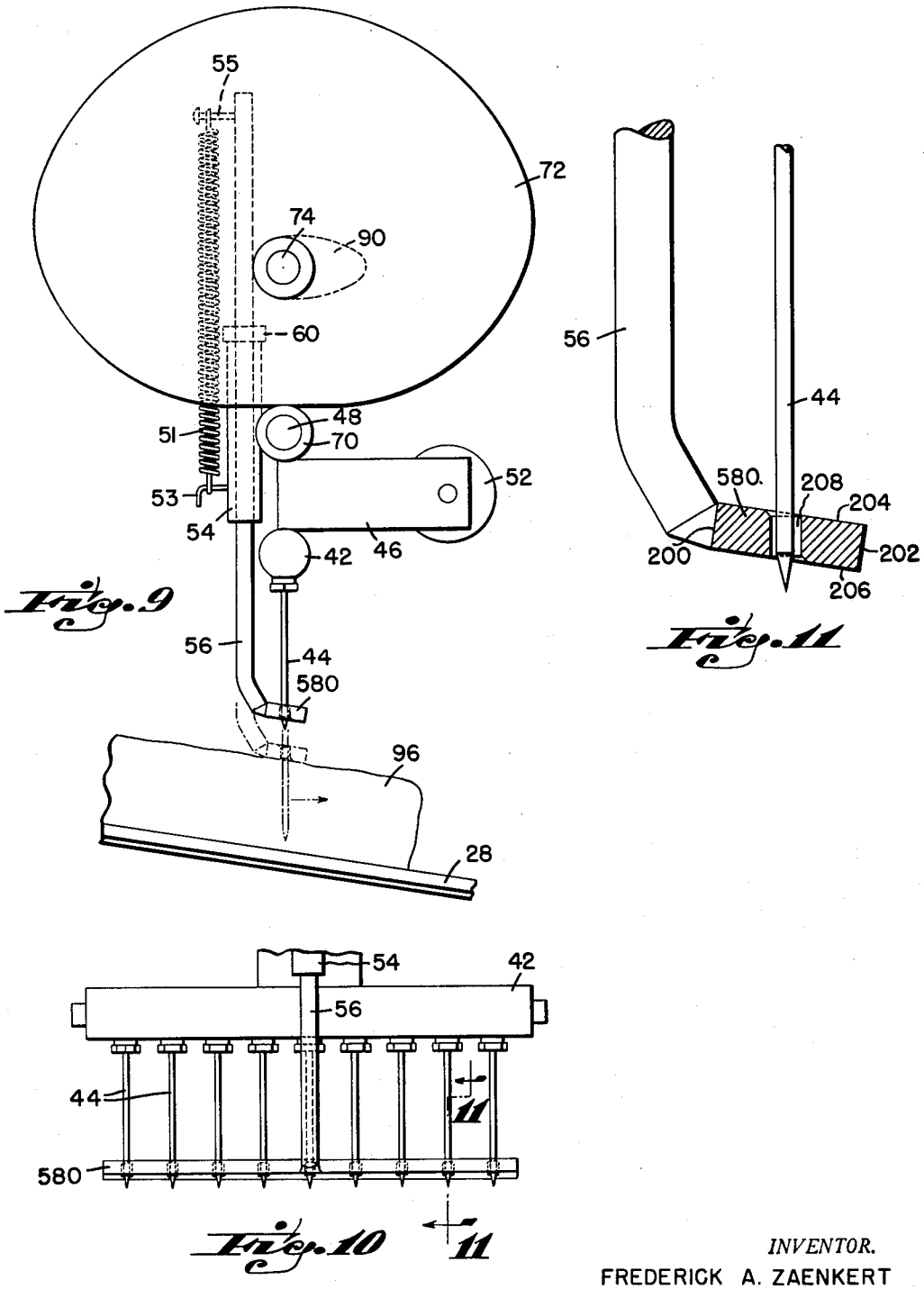

United States Patent Office 2,756,666
Patented July 31, 1956

2,756,666
MEAT IMPREGNATOR

Frederick A. Zaenkert, Greenhills, Ohio, assignor to The Cincinnati Butchers' Supply Company, Cincinnati, Ohio, a corporation of Ohio Application March 17, 1953, Serial No. 342,860

18 Claims. (Cl. 99—257)

This invention relates to an impregnator, and particularly to means for automatically impregnating meat products with a predetermined quantity of pickling fluid.

An object of the invention is to provide a device which includes simple, yet highly effective means for impregnating meat products as they are advanced in a step-by-step manner over a supporting surface.

Another object of the invention is to provide a meat impregnating device which includes a plurality of hollow needles which are utilized for the dual purpose of injecting the pickling fluid into the meat and of advancing the meat product in a step-by-step manner over a supporting surface.

A further object of the invention is to provide an impregnator having the hereinabove described characteristics which includes a single manifold disposed transversely across a meat supporting member for reciprocatory motion toward and away from the support, said manifold having a single row of hollow needles secured to and depending therefrom for insertion into and withdrawal from a meat product carried by the support. The manifold is pivotally mounted whereby it may be rocked about an axis transverse to the support for thereby imparting a forward movement to the meat product engaged by the needles as said needles are withdrawn therefrom. In this manner I utilize the needles, per se, as the sole means for advancing the meat product in a step-by-step manner over the support.

Still another object of the invention is to provide an impregnator which is portable in that it is a compact self-contained unit which may be moved from place to place, thereby greatly enhancing its utility.

Still a further object of the invention is to provide a meat impregnating device which is characterized by the absence of endless belts and other types of conveying mechanisms, and which is further characterized by the absence of heavy platens and other pressure applying and/or needle guiding devices.

These and other objects are attained by the means described herein and as disclosed in the accompanying drawings, in which Fig. 1 is a side elevational view of an impregnating device embodying the teachings of the present invention.

Fig. 2 is a front view of the device of Fig. 1 with parts thereof cut away for clarity of detail and understanding.

Figs. 3 and 4 are enlarged views illustrating the details of the pickling-fluid control-valve in open and closed positions, respectively.

Fig. 9 is an enlarged view similar to Figs. 5 and 6, showing a modified type of foot member.

Fig. 10 is a front view of the foot and needle assembly of Fig. 9.

Fig. 11 is a sectional view on line 11—11 of Fig. 10.

Figure 1:
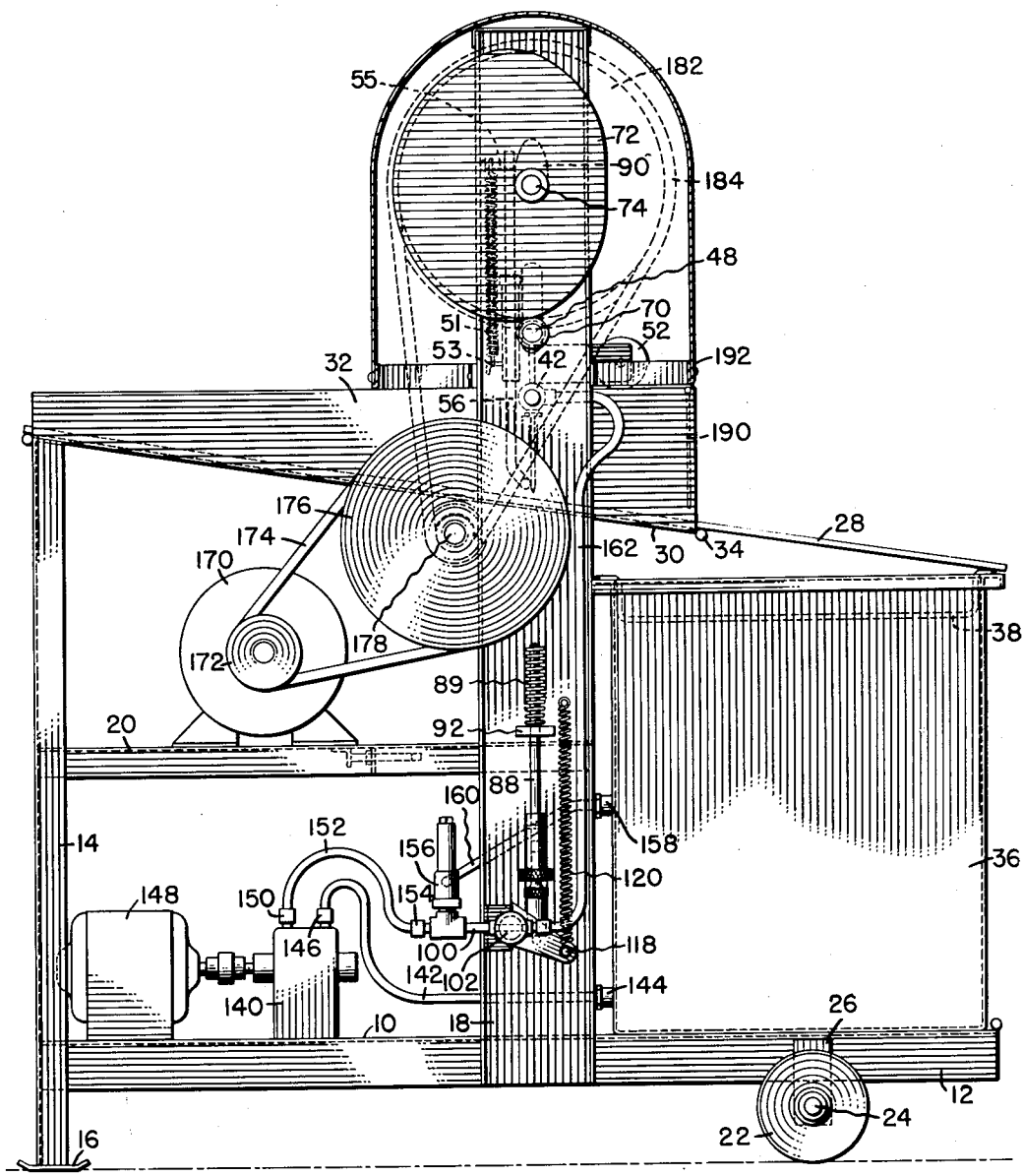

Broadly speaking, the device includes a framework defined by a base or lower platform 10 having vertically depending sides 12, a pair of laterally spaced, forward, vertical elements 14 whose lower ends terminate in feet 16, a pair of laterally spaced intermediate elements 18, and an intermediate platform 20 secured to and spanning elements 14 and 18.

In the preferred embodiment of the invention that end of the base remote from its forward end may be supported upon wheels 22 journaled to an axle 24 spanning brackets 26 secured to sides 12 of the base.

The upper portion of the framework is provided with an inclined article support, which comprises a plurality of elongate, laterally spaced elements 28 upon which the meat products to be treated are supported. A fluid-impervious channel including a bottom 30 and upstanding side walls 32 is provided in spanning relationship with elements 14 and 18, said channel terminating in rear edge 34 spaced rearwardly of vertical element 18.

The numeral 36 denotes an open topped container supported upon base 10 rearwardly of element 18. As best illustrated in Fig. 1, the article supporting elements 28 extend across the entire length of the container, whereas the rear end of the channel bottom overhangs the container whereby fluids flowing down bottom 30 will be gravitationally discharged into the container.

Preferably a removable rack comprising a plurality of laterally spaced elements 38 is provided in spanning relationship across the upper end of the container for precluding the unintentional or accidental discharge of foreign particles into the interior of the container.

As best illustrated in Fig. 2, an impregnator head 40 which comprises an elongated manifold 42 from which a plurality of laterally spaced, hollow needles 44 project is mounted for reciprocatory motion toward and from the article support, for thereby sequentially effecting alternate insertion and withdrawal of the needles 44 into and out of a meat product resting upon support 28.

Manifold 42 is secured to and carried by the lower end of a bracket 46, the upper end of which terminates in a sleeve or bearing block 50 through which transverse shaft or head supporting member 48 is rotatably journaled. Sleeve 50 is mounted between collars 52 and 540 suitably fastened to shaft 48 by means of set screws, or the like.

As best illustrated in Figs. 5 through 8, inclusive, bracket 46 is provided with a weighted element 52 at a location remote from manifold 42, the purpose of the weighted member being to normally and continuously urge the manifold assembly in a clockwise direction relative to and about shaft 48.. An elongate sleeve 54 is fixedly secured relative to bracket 46, said sleeve being dimensioned to slidably receive rod 56 whose lower end terminates in a presser foot 58. A collar 60 secured to and carried by rod 56 is adapted to engage the upper end of sleeve 54 for determining the lowermost position of foot 58 with respect to manifold 42.

As illustrated in Figs. 1 and 2, a spring 51 may be provided between sleeve 54 and rod 56 for yieldably urging the shaft to the lowermost position. One end of the spring may engage pin 53 secured to and carried by sleeve 54, the other end pin 55 of rod 56.

The opposite ends of transverse shaft 48 are provided with cam followers 70 adapted to engage the outer periphery of cams 72 secured to and carried by rotatable cam shaft 74 suitably mounted in bearings 76 carried by side walls 78 and 80. Transverse shaft 48 is likewise mounted to and between a pair of laterally spaced vertical guide members 82 which pass through apertures 84 of a guide bracket 86. The lower end of guide members 82 are adjustably connected to the upper ends of downwardly depending guide rods 88 which are threadably receivable in the guide members. A lock nut 91 secures the parts in adjusted relationship.

Rods 88 are normally urged upwardly by springs 89 whose lower ends rest upon an apertured stop element 92 through which the guide rods slidably pass and the upper ends of which engage stops 94 secured to and carried by the guide rods 88. In this manner I have provided simple yet highly effective means for normally urging the entire impregnator head assembly 40 upwardly in operative relationship with cams 72.

A third cam 90 is secured to and carried by cam shaft 74 whereby the periphery of the cam will engage the upper portion of rod 56 of pressure foot 58, thereby imparting a positive rocking motion of the impregnator head assembly relative to and about shaft 48 incident to initiation of the retraction cycle of the impregnator head assembly as determined by cams 72.

With particular reference now to Figs. 5 through 8, inclusive, it will be noted that rotation of cams 72 will effect a substantially vertical lowering of the impregnator head assembly for initially lowering pressure foot 58 into contacting relationship with the upper surface 94 of the meat product 96 resting upon support 28. When the foot 58 has thus contacted the piece of meat, further lowering of the impregnator head assembly will result in relative motion of rod 56 with and relative to sleeve 54. Lowering of the impregnator head assembly also results in positive insertion of hollow needles 44 into the piece of meat 96 by a predetermined distance established by the throw of cams 72.

Figure 7:
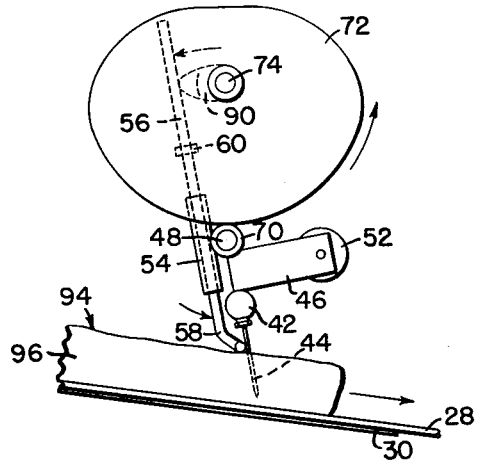
Figure 8:
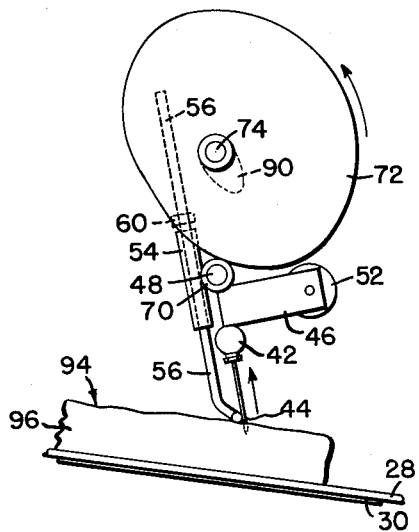

Further rotation of cams 72 and 90 will, as best illustrated in Fig. 7, result in initiation of the retracting cycle of the impregnator head assembly with the concurrent rocking of the head assembly relative to and about shaft 48 incident to engagement of cam 90 with the upper portion of rod 56, thereby imparting a positive forward motion of the meat product over the support 28. Further rotation of cams 72 and 90 will result in the attainment of the conditions illustrated in Fig. 8, it being noted that weighted member 52 will become effective as soon as the needles have been fully retracted from the meat product for automatically returning the impregnator head assembly to the substantial vertical condition illustrated in Fig. 5 preparatory to a repetition of the cycle.

With reference now to Figs. 2, 3 and 4, it will be noted that one of the guide rods 88 has been utilized for positively actuating a valve in the fluid pressure line 100 for establishing a flow of pickling fluid, under pressure, to manifold 42 and needles 44 during those periods of time when the impregnator head assembly has been advanced or lowered relative to support 28. The numeral 102 denotes generally a valve casing provided with a rotatable plug 104 having an axial passage 106 therethrough for alignment relative to ports 108 and 110.

During those periods of time when the impregnator head is in its fully advanced or lowered position, the lower end of stud 112 will have engaged pin 114 of a lever 116 operatively secured to rotatable plug 104 of the valve for thereby rotating the plug for permitting a flow of fluid, under pressure, from pump 140 to the manifold 42 and hollow needles 44. A spring 120, one end of which engages lever 116 as at 118, is provided for normally urging valve lever 116 to an elevated, valve-closing position illustrated in Fig. 4. From the foregoing it will be apparent that during those periods of time when actuator rods 88 are elevated, stud 112 will be out of contact with pin 114 for thereby effectively terminating the flow of impregnating fluid to manifold 42 and hollow needles 44.

In the preferred embodiment of the invention stud 112 includes a threaded shank portion 130 receivable within an internally threaded sleeve 132 secured to and carried by the lower end of actuator rod 88 such as, by way of example, a pin or rivet 134. Precise adjustment of the stud relative to actuator rod 88 may be effected in this manner, the parts being locked in adjusted position by means of lock nut 136, which threadably engages portion 130 of stem 112.

With reference now to Fig. 1, it will be noted that pickling fluid housed within container 36 is caused to circulate through pump 140 via suction line 142 interconnecting the lower interior of the container as at 144 to intake port 146 of the pump. A motor 148 is provided for normally and continuously driving pump 140. The pump discharge port 150 is connected via conduit 152 to intake port 154 of a pressure relief valve 156. During those periods of time when valve 102 is closed, the fluid, under pressure, will be by-passed through return line 160 of the pressure relief valve into container 36 as at 158.

It will be noted that by thus continuously operating pump 140 the pickling fluid will always be available under pressure, it being noted that when valve 102 has been opened the fluid under pressure will flow upwardly through feed line 162 to manifold 42, thence through needles 44.

Cam shaft 74 may be driven by motor 170 suitably mounted on intermediate platform 20. Motor pulley 172 may be secured in driven relationship to pulley 176 of an intermediate shaft 178 by means of belt 174. The other end of intermediate shaft 178 may be provided with a sprocket wheel 180 connected in driven relationship with sprocket wheel 182 secured to and carried by cam shaft 74, said sprockets being interconnected by means of sprocket chain 184.

Figure 5:
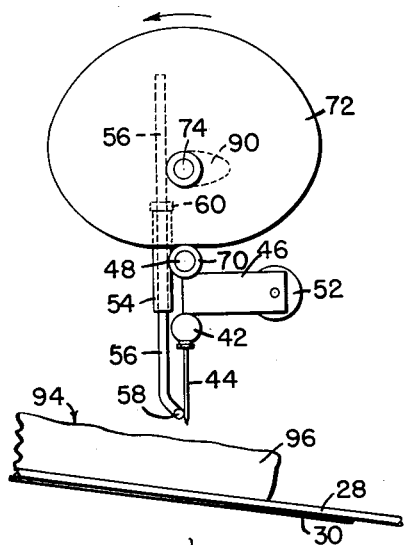
Figs. 5, 6, 7 and 8 are diagrammatic views illustrating the sequential operation of the device throughout one complete cycle.
Figure 6:
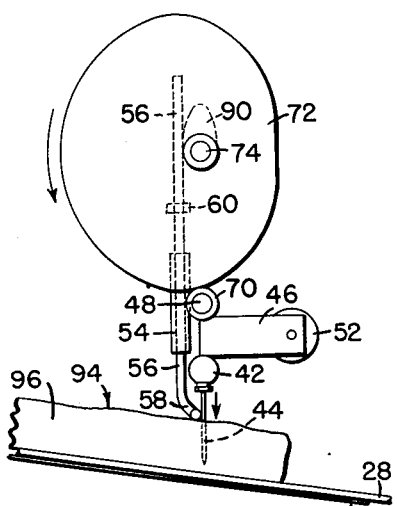

From the foregoing it will be noted that in operation of the device an operator will place a piece of meat to be treated, such as, by way of example, a slab of bacon, upon support 28, during that period of time when the impregnator head assembly is at its fully retracted or elevated position, note Fig. 5. Rotation of cam shaft 74 will result in needles 44 being inserted into the meat product a predetermined distance, after which pickling fluid will be discharged through the hollow needles into the meat. The slab of meat will be positively and automatically advanced forwardly across support 28 incident to the retraction or elevating cycle by reason of the rocking action imparted to the impregnator head assembly by means of cam 90, note Fig. 7.

It will be noted that bottom and side walls 30 and 32 will effectively confine the fluid, and in the preferred embodiment of the invention I prefer to suspend a splash shield 190 from the rearward, lower edge of an arcuate hood 192, note Fig. 1. It will be understood that shield 190, being freely suspended, will be swung rearwardly, that is, to the right, as the meat product is advanced to the right in a step-by-step motion.

Any excess of pickling fluid will be free to drain from the impregnated meat product, the fluid being discharged into container 36, thereby enabling the fluid to be reused.

As best illustrated in Fig. 2, I have provided suitable side panels 194 and 196 which house the various moving parts of the device whereby to provide a safe device.

It will be noted that the device does not require fixed piping, nor connection with outside pressure lines or drains. In contrast thereto my device is truly portable and is self-contained, requiring only connection to an electrical outlet for rendering it operative. It will be noted that the mobile character of the device greatly enhances its utility, enabling it to be moved from place to place in a packing plant as the need might arise. Highly satisfactory results have been obtained when the device is operated by one man, it being noted that the meat products to be treated are inserted at the upper, forward or left end of the device, being removed therefrom, after being fully impregnated, at the rear, lower or right end.

With particular reference now to Figs. 9, 10 and 11, it will be noted that the lower end of rod 56 has been provided with a modified form or type of presser foot denoted by the numeral 580, which comprises an elongated bar including front, rear, upper and lower faces 200, 202, 204 and 206, respectively, and having a plurality of laterally spaced bores, apertures or guideways 208 therethrough, one for each of needles 44. The axis of each of the bores, apertures or guideways 208 is in parallelism with the axis of their respective needles 44, said apertures being dimensioned to loosely receive the needles, as clearly indicated in Fig. 11, it being understood that the needles will be shifted axially relative to their respective apertures, incident to operation of the device.

The structural details of the modified presser foot not only effectively guides the needles while being advanced and retracted through the cycle, best illustrated in Figs. 5, 6, 7 and 8, but also precludes any bending of the needles incident to rocking of the head assembly for advancing articles 96 engaged by the needles along support 28.

It should be understood that various changes in the structural details of the device may be made, within the scope of the appended claims, without departing from the spirit of the invention.

What is claimed is:

1. An impregnator comprising, in combination, an article support, an impregnator head, an impregnator-head supporting member located above and extending transversely of the article support, means pivotally suspending said head from said supporting member, means for imparting reciprocatory motion to the head for sequentially advancing and retracting it relative to the support, a plurality of hollow needles fixedly secured to and projecting downwardly from said head, a source of fluid under pressure, means for selectively discharging fluid through said needles, and means operative incident to retraction of the head for rocking it about the supporting member to advance the articles engaged by said needles along the support.

2. An impregnator comprising, in combination, an article support, an impregnator head, reciprocable means located above and extending across said article support, means pivotally suspending said head from said reciprocable means, means for imparting reciprocatory motion to the first mentioned means for sequentially advancing and retracting it and the impregnator head relative to the support, a plurality of hollow needles secured to and projecting downwardly from said head, a source of fluid under pressure, means for selectively discharging fluid through said needles, an article engaging member reciprocably mounted to the head, and means operative incident to retraction of the head for rocking the article engaging member to rock the head about its pivotal suspension and thereby advance the articles engaged by said member and needles along the support.

3. An impregnator comprising, in combination, an article support, an impregnator head, a reciprocably mounted member located above the article support, means for pivotally suspending the impregnator head from said member, means for imparting reciprocatory motion to said member for sequentially advancing and retracting it and the impregnator head relative to the support, a plurality of hollow needles secured to and projecting downwardly from said head for sequential insertion into and withdrawal from an article carried on the support, a source of fluid under pressure, means discharging fluid through said needles when the head has been fully advanced and for terminating the discharge of fluid incident to retraction of the head, and other means operative incident to retraction of the head for rocking the head and needles about the pivotal suspension to advance along the support and by a predetermined distance the articles engaged by said needles on the advance stroke of the head.

4. An impregnator comprising, in combination, an article support, an impregnator head assembly comprising an elongate manifold, an actuator shaft spaced above and spanning said support, means pivotally suspending said manifold from said actuator shaft, an article engaging member, means mounting said member to and for endwise axial movement relative to the manifold and head assembly, means for imparting reciprocatory motion to the actuator shaft for sequentially advancing and retracting it relative to the support, a plurality of hollow needles secured to and projecting downwardly from said manifold for sequential insertion into and withdrawal from an article resting on the support, a source of pickling fluid under pressure, means for discharging said fluid through said needles when the head has been fully advanced and for terminating the discharge of fluid incident to retraction of the head, means synchronized with the means for imparting reciprocatory motion to the actuator shaft and operative incident to retraction of said shaft for engaging the article engaging member for rocking the entire impregnator head assembly and article engaging member about the actuator shaft to advance along the support and by a predetermined distance the articles engaged by said needles on the advance stroke of the head assembly.

5. Apparatus for impregnating a needle penetrable body comprising means for supporting a body for free sliding movement in one direction along a predetermined path, a head overlying said means, means for effecting reciprocation of the head toward and away from said means, a plurality of hollow pointed needles, means pivotally coupling the needles with said head for swinging movement over said means about an axis extending transversely of said path with their pointed ends directed toward the supporting means, a source of fluid under pressure, means for discharging the fluid through said needles in a predetermined timed relation with the movement of the needles by the head relative to the supporting means, a body engaging presser member, means supporting the presser member on the head for reciprocal movement therewith and for swinging movement about said axis and for reciprocal movement independently of the head in a path paralleling the needles, the presser member including a foot portion disposed for contact with the sides of the needles opposite from the direction of travel of a body on the supporting means, yieldable means urging the presser mmeber in a direction to move said foot portion along the needles toward the pointed ends thereof, and means for effecting swinging of the needles and presser member in said one direction following a predetermined movement of the head toward said supporting means.

6. The invention according to claim 5 wherein said last means includes a rotary thrust element adapted for engagement with the presser member.

7. The invention according to claim 5, with a gravity actuated means for effecting reverse swinging movement of the needles and presser member after the needles are withdrawn from the body by a predetermined movement of the head away from said supporting means.

8. The invention according to claim 7, wherein said gravity actuated means comprises a weight member coupled with the needles upon the opposite side thereof from the presser member.

9. The invention according to claim 5, wherein said head comprises a shaft, vertical guides at opposite sides of the body supporting means, rod members slidably supported in said guides and secured at their top ends to adjacent ends of the shaft, and said means for effecting said reciprocation of the head comprising a rotary cam and a follower engaged thereby and carried on the shaft.

10. The invention according to claim 9, wherein the said means for effecting the timed discharge of fluid through the needles includes a fluid conducting conduit leading to the needles, a control valve in said conduit, and means for effecting opening of said valve by one of said rods upon a predetermined extent of movement of the latter in one direction.

11. The invention according to claim 5, wherein the said head reciprocates in a fixed vertical plane and the said means for supporting a body comprises an elongate support disposed at a downward inclination in the said direction of movement of a body.

12. Apparatus for impregnating a needle penetrable body comprising means for supporting a body for sliding movement in one direction, a shaft supported for rotation above and transversely of said means, a second shaft disposed above and across the body supporting means below and parallel to the first shaft, means supporting the second shaft for reciprocatory movement between the first shaft and said means, means constantly urging upward movement of the second shaft, a plurality of pointed hollow needles suspended from the second shaft for swinging movement about the axis of the latter, a cam carried by the first shaft and having operative connection with the second shaft for imparting downward movement to the latter, a guide operatively coupled with and substantially paralleling the needles to swing therewith, a presser member comprising a rod slidably supported in said guide and a foot portion positioned at the rear sides of said needles, yieldable means urging movement of said presser member downwardly, and means actuated by the first shaft for imparting swinging motion to said needles and guide means in the said one direction and synchronized with said cams to effect such motion while the second shaft and needles carried thereby are in their lowermost positions.

13. The invention according to claim 12, wherein the last means comprises a cam element carried on and rotated by the first shaft and imparting said swinging motion to the needles and guide means by engagement with said presser member.

14. The invention according to claim 12, with a gravity actuated means coupled with the needles and functioning to reversely swing the needles, the guide and the presser member following the functioning of the last named means and after retraction of the needles from a body on the supporting means.

15. The invention according to claim 12, with a bracket coupled with the needles and extending forwardly in the said direction of movement of a body on the support, and a weight carried by the bracket forwardly of the needles and functioning to reversely swing the needles, the guide and the presser member following the functioning of the last named means and after retraction of the needles from a body on the supporting means.

16. Apparatus for impregnating meat and like bodies of material comprising a support adapted to have such bodies moved in one direction thereon, a battery of hollow pointed needles disposed above and transversely of the support, mechanism operative to actuate the needles in the material impregnating operation to move the needle points first in a straight path toward the support, then along a path in said one direction substantially at right angles to the first path and then reversely along a path substantially defining the hypotenuse side of a triangle of which the first and second paths form respectively the back and base, said mechanism including a reciprocating cross-head pivotally carrying the needle battery to swing on an axis extending across the support, a material body engaging presser pivotally carried by the cross-head to swing with the needle battery and movable independently of the needles lengthwise along the sides of the needles away from the direction of movement along the second path, means for effecting a reciprocation of the cross-head toward and away from the support, rotary cam means engageable with the presser and functioning to effect swinging movement of the same and the needle battery, and means for ejecting fluid through the needles at a predetermined period in the operation of said mechanism, said presser coacting with the needles to effect movement of the material by the needles in the movement of the points along the second named path.

17. Apparatus according to claim 16, wherein the means for effecting reciprocation of the cross-head comprises rotary cams rotating synchronously and coaxially with said cam means.

18. An impregnator comprising, in combination, an article support, an impregnator head assembly including a plurality of article-penetrable needles and an article engaging element, a head assembly supporting member, means for imparting reciprocatory motion to said member, means pivotally suspending said head assembly from said member, means actuating the said article engaging element only when the head assembly is in an advanced position toward the article support for swinging said assembly relative to its support member, and means for swinging the assembly back to its original position, whereby the free ends of the needles will describe an L path incident to one complete reciprocatory cycle of the head assembly.

References Cited in the file of this patent

UNITED STATES PATENTS

| | | |
|---|---|---|
| 2,587,024 | Avery | Feb. 26, 1952 |
| 2,641,990 | Allbright et al. | June 16, 1953 |
| 2,645,172 | Allbright et al. | July 14, 1953 |
| 2,656,785 | Gannon et al. | Oct. 27, 1953 |